Feb. 20, 1923.

E. H. SCHANE.
REEL.
FILED DEC. 21, 1921.

INVENTOR
Edward H. Schane,

Feb. 20, 1923.
E. H. SCHANE.
REEL.
FILED DEC. 21, 1921.

INVENTOR
Edward H. Schane,
Byrnes, Stebbins, Burgess & Parmelee,
his Attys.

Patented Feb. 20, 1923.

1,446,070

UNITED STATES PATENT OFFICE.

EDWARD H. SCHANE, OF YOUNGSTOWN, OHIO.

REEL.

Application filed December 21, 1921. Serial No. 523,850.

*To all whom it may concern:*

Be it known that I, EDWARD H. SCHANE, a citizen of the United States, residing at Youngstown, in the county of Mahoning and State of Ohio, have invented a new and useful Improvement in Reels, of which the following is a full, clear, and exact description.

The present invention relates broadly to winding and reeling, and more particularly to reels intended primarily for plain or barbed wire, although it will be obvious that its use is not limited in this respect.

It has heretofore been proposed, as shown, for example, in the patent to Charles I. Dailey, No. 1,259,725, of Mar. 19, 1918, to construct a reel cage barrel from members adapted to be twisted together to maintain them in proper relationship, and then force head members into position. Such reels in finished form have comprised six separate members, and a considerable amount of wire to provide for twisting and overlap of the separate members. By reason of this twisting together of the cage barrel members, it has not been possible to completely collapse the reel for storage. Also, the two separate head members at each end have not presented a smooth winding surface, as they lie in different planes.

The present invention has for its object improvements in reels of this general character, and the production of such reels from a fewer number of parts, a less amount of wire, and with fewer operations, whereby both the cost and the weight are materially decreased.

The foregoing and other objects of the invention, together with their attendant advantages, will be apparent from the accompanying drawings, illustrating a preferred embodiment of my invention, and forming a part of this specification, it being premised that changes may be made in the arrangement and structural details of the parts within the scope of the appended claims, without departing from the spirit of the invention, in which:

Figure 1:
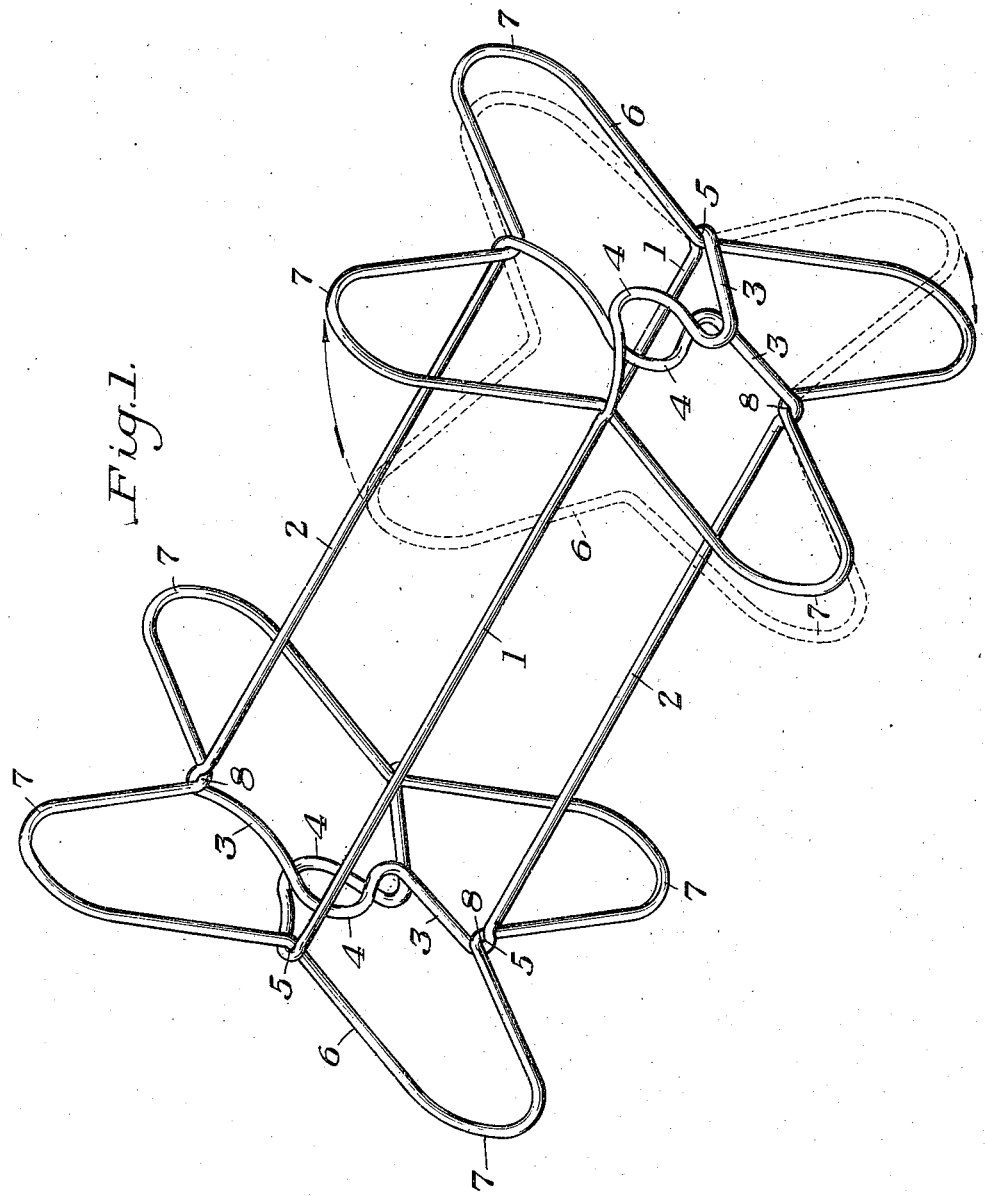
Figure 1 is a perspective view of a reel constructed in accordance with the present invention.
Figure 2:
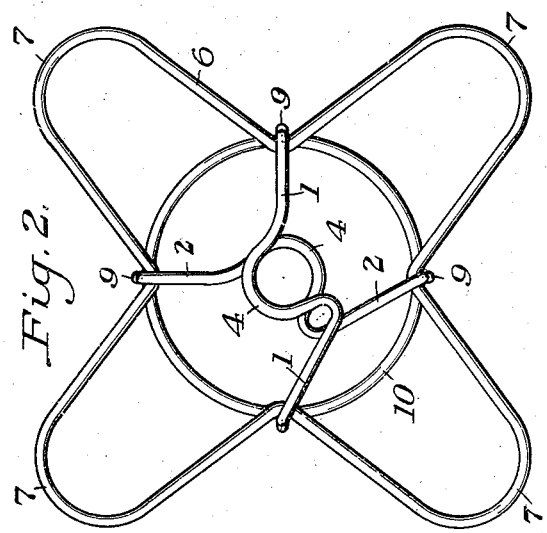
Figure 2 is an end elevation of a reinforced reel.
Figure 3:
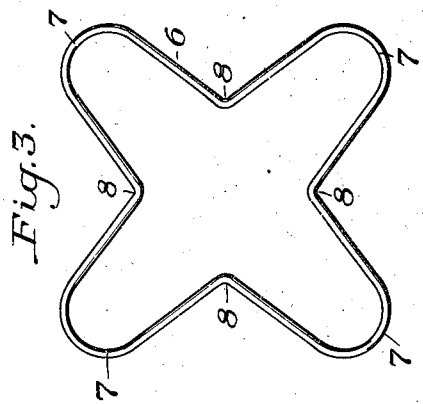
Figure 3 is a plan view of one of the heads.
Figure 4:
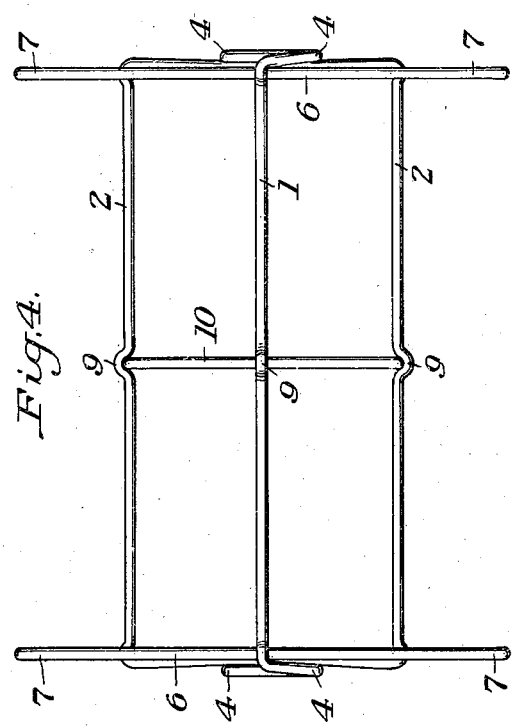
Figure 4 is a side elevation of the reinforced reel of Figure 2.
Figure 6:
Figure 6 is an end view of the member illustrated in Figure 5.
Figure 5:
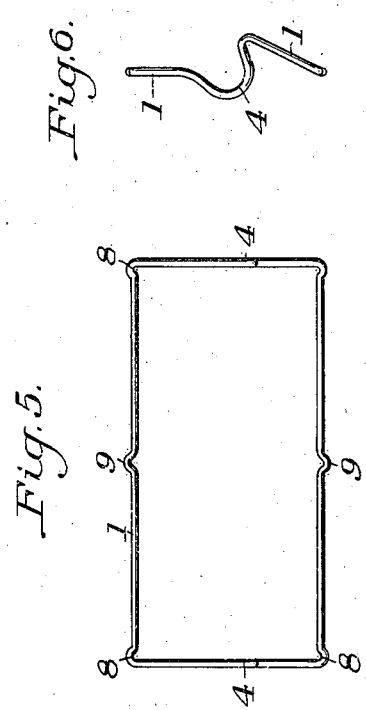
Figure 5 is a plan view of one of the cage barrel members.

As shown in the drawings, a reel constructed in accordance with the present invention comprises two cage barrel members 1 and 2 corresponding in all respects one to the other. These members are of generally rectangular shape with side portions adapted to have wire or other material wound thereon, and with end portions 3 slightly offset intermediate their lengths to form half bearings 4. These half bearings are adapted to overlap in a completed reel, as illustrated, to form a center bearing for a bar or rod, not shown, serving as a rotatable support for the reel during winding and unwinding. Adjacent each end, each of the side portions is bent outwardly to provide seats 5.

The heads 6, each of which may be formed from a single piece of wire of any desired resiliency having its ends suitably secured together, are of generally cross-shaped formation having four substantially uniform loops 7 each spaced at substantially 90° from the adjacent loops. The sides of the loops 7 intersect to form seats 8, also substantially uniformly spaced both radially and circumferentially. The two heads 6 required for each reel are similar in all respects one to the other.

In assembling a reel, two of the cage barrel members are taken and slipped one over the other, as clearly shown in Figure 1, with the end portions 3 crossing at substantially right angles, whereby these end portions extend substantially diagonally of the cage barrel as distinguished from transversely thereof. One of the heads 6 is then slid between the cage barrel members, as shown in dotted lines in Figure 1, with each of its loops 7 extending between a side portion of one of the cage barrel members, and a side portion of the other cage barrel member. The head is then forced into its full line position of Figure 1, to bring the seats 8 into engagement with the seats 5. The other head is then similarly placed in position, and the reel is ready to be mounted upon a rotatable support and have wire or other material wound thereon.

In a completed reel, due to the diagonal extension of the end portions 3, they serve as tension members for the heads, and the heads in turn serve as compression members, whereby no intertwisting of any of the members is necessary. This permits the reel to be readily collapsed by simply removing the heads. Also, by forming each of the heads of a single piece of wire, all of the body of the head may lie in a common plane, thereby presenting a smooth winding surface toward the cage barrel.

In some instances, it has been found desirable to reinforce the cage barrel members to prevent bending of the same during the winding operation. This may be effectively accomplished by forming a bend 9 in each of the side portions of the cage barrel members and providing a ring 10 adapted to be forced into engagement therewith. It will be obvious that the ring may be either closed or have loosely abutting ends, as the side portions hold it in a condition of compression.

A reel constructed in accordance with the present invention comprises but four pieces, namely, two cage barrel members and two heads. As the two heads, and the two cage barrel members are alike in construction, however, but two shaping dies are required to form the two members. This is very advantageous, as it results in a material decrease in the cost of production, and a substantial saving in the amount of wire required. Where the reinforcing ring is provided, a separate operation for forming the ring is of course necessary.

Further advantages arise from the ease of assembly and collapse of the reel.

I claim:

1. A reel, comprising a cage barrel and opposite heads, the cage barrel comprising a pair of substantially rectangular members having their end portions disposed diagonally from corner to corner thereof, substantially as described.

2. A reel, comprising a cage barrel and opposite heads, the cage barrel comprising a pair of similar, independent members having their end portions extending diagonally thereof whereby the opposite sides of each of said members form diagonally opposite corners of the cage barrel, substantially as described.

3. A reel, comprising a cage barrel formed from two cage barrel members, each of said members having portions extending diametrically of the cage barrel, and heads cooperating with said cage barrel, substantially as described.

4. A reel, comprising a cage barrel formed from two cage barrel members, each of said members having portions extending diametrically of the cage barrel, and a one-piece head at each end of said cage barrel, substantially as described.

5. A reel, comprising a cage barrel, opposite heads, the cage barrel comprising a pair of substantially rectangular members having their end portions disposed diagonally thereof, and reinforcing means for the central portion of said cage barrel, substantially as described.

6. A reel, comprising a cage barrel, opposite heads, the cage barrel comprising a pair of similar independent members having their end portions extending diagonally thereof, and reinforcing means for said cage barrel, substantially as described.

7. A reel, comprising two cage barrel members, two head members, the cage barrel members being held in position to form a cage barrel by said head members, and reinforcing means for said cage barrel, all of the parts of said reel being formed of wire, substantially as described.

8. A reel, comprising a cage barrel formed from two cage barrel members, each of said members having portions extending diametrically of the cage barrel, heads cooperating with said cage barrel, and reinforcing means for said cage barrel, substantially as described.

9. In a reel, a cage barrel formed from a pair of similar members adapted to slide one within the other during assembly whereby the sides of each member form diagonally opposite corners of the barrel, said members having their end portions extending diagonally of the barrel with the end portions each having an offset adapted to cooperate with the offset in the end portion of the other member and form a bearing when the members are assembled, and a one-piece head for each end of said cage barrel adapted to hold said members in position, substantially as described.

10. In a reel, a cage barrel formed from a pair of similar members having their end portions extending diagonally of the barrel with the end portions each having an offset adapted to cooperate with the offset in the end portion of the other member and form a bearing when the members are assembled, and a one-piece head for each end of said cage barrel adapted to hold said members in position, substantially as described.

In testimony whereof I have hereunto set my hand.

EDWARD H. SCHANE.